United States Patent
Jang

(10) Patent No.: US 10,429,651 B2
(45) Date of Patent: Oct. 1, 2019

(54) HEAD UP DISPLAY DEVICE

(71) Applicant: LG INNOTEK CO., LTD., Seoul (KR)

(72) Inventor: Seong Ha Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 92 days.

(21) Appl. No.: 15/553,945

(22) PCT Filed: Feb. 26, 2016

(86) PCT No.: PCT/KR2016/001895
§ 371 (c)(1),
(2) Date: Aug. 25, 2017

(87) PCT Pub. No.: WO2016/137262
PCT Pub. Date: Sep. 1, 2016

(65) Prior Publication Data
US 2018/0045961 A1 Feb. 15, 2018

(30) Foreign Application Priority Data

Feb. 26, 2015 (KR) .................. 10-2015-0026975
Apr. 24, 2015 (KR) .................. 10-2015-0057684

(51) Int. Cl.
*G02B 27/01* (2006.01)
*G02B 26/08* (2006.01)
*G02F 1/1335* (2006.01)

(52) U.S. Cl.
CPC ......... *G02B 27/0172* (2013.01); *G02B 26/08* (2013.01); *G02B 27/01* (2013.01);
(Continued)

(58) Field of Classification Search
CPC ............ G02B 2027/0118; G02B 26/08; G02B 27/01; G02B 27/0101; G02B 27/0172; G02F 1/133504; G02F 1/133553
See application file for complete search history.

(56) References Cited

U.S. PATENT DOCUMENTS

2011/0267702 A1   11/2011  Fujimoto
2013/0100524 A1   4/2013   Magarill et al.
(Continued)

FOREIGN PATENT DOCUMENTS

JP   2004-170879 A   6/2004
JP   5344069 B2      8/2013
(Continued)

OTHER PUBLICATIONS

International Search Report in International Application No. PCT/KR2016/001895, filed Feb. 26, 2016.

*Primary Examiner* — Viet D Pham
(74) *Attorney, Agent, or Firm* — Saliwanchik, Lloyd & Eisenschenk

(57) ABSTRACT

The embodiments provide a head up display device comprising: at least one light source for emitting light; a first optical member for changing the path of light emitted from the light source; an optical sheet for transferring light emitted from the first optical member to a second optical member described below; and the second optical member for changing the path of light transferred from the optical sheet, and including a first surface in the direction of the optical sheet and a second surface in the direction of an image panel described below, wherein the first surface and the second surface are both curved surfaces.

20 Claims, 16 Drawing Sheets

(52) U.S. Cl.
   CPC ... *G02B 27/0101* (2013.01); *G02F 1/133504* (2013.01); *G02F 1/133553* (2013.01); *G02B 2027/0118* (2013.01)

(56) References Cited

U.S. PATENT DOCUMENTS

| | | | | |
|---|---|---|---|---|
| 2014/0022645 | A1* | 1/2014 | Matsuura | G02B 27/0101 359/626 |
| 2015/0198802 | A1* | 7/2015 | Ando | G02B 27/0101 359/200.8 |
| 2016/0116735 | A1* | 4/2016 | Hayashi | G02B 27/0101 345/7 |

FOREIGN PATENT DOCUMENTS

| | | |
|---|---|---|
| JP | 5674032 B2 | 2/2015 |
| KR | 10-2012-0011228 A | 2/2012 |
| KR | 10-2014-0008245 A | 1/2014 |
| KR | 10-2014-0077299 A | 6/2014 |
| KR | 10-1481582 B1 | 1/2015 |

\* cited by examiner

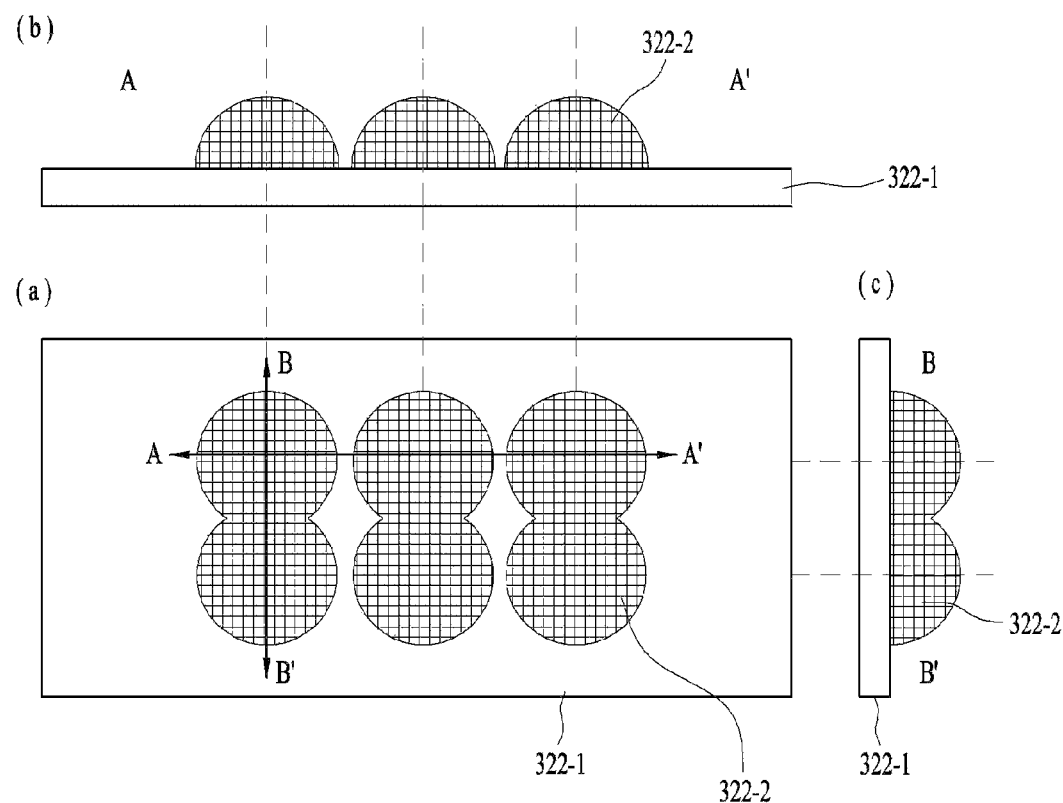

322

(a)

(b)

(c)

(d)

(a)

(b)

(c)

(d)

326b (a)

(b)

HEAD UP DISPLAY DEVICE

CROSS-REFERENCE TO RELATED APPLICATIONS

This application is the U.S. national stage application of International Patent Application No. PCT/KR2016/001895, filed Feb. 26, 2016, which claims priority to Korean Application No. 10-2015-0026975, filed Feb. 26, 2015, and Korean Application No. 10-2015-0057684, filed Apr. 24, 2015, the disclosures of each of which are incorporated herein by reference in their entirety.

TECHNICAL FIELD

Embodiments relate to a head up display device.

BACKGROUND ART

A head-up display device is a transparent display which displays various pieces of information necessary for driving at the main viewpoint position of a pilot or a driver as a virtual image while overlapping the information with an external visual field, in order to minimize movement of the viewpoint of the pilot or the driver.

The head up display device, which includes a display unit, an optical system, a holographic combiner, etc., forms a designated image of driving information, such as current vehicle speed, position, etc., through the display unit, and projects the formed image onto the holographic combiner attached to a front window of the vehicle, i.e., a windshield, using the optical system. A designated image is formed in the air in the front region of the vehicle and the driver may view information regarding driving, such as the current position, speed, etc., through the formed image without requiring the driver to turn his/her head to loot at a dashboard of the vehicle.

Such a head up display system uses a cathode-ray tube (CRT) or a liquid crystal display (LCD) now, as a display unit to display information regarding driving of a vehicle as a designated image.

Light having image information having passed through an image panel is provided to a driver through a mirror or a windshield and, in this case, distribution of light incident upon the image panel may not be uniform and thus optical uniformity of the image provided to the driver may be lowered.

Particularly, a light emitting unit uses light emitting diodes, etc., but, in order to improve image quality in a head up display device, it is necessary to supply uniform light to the image panel while minimizing optical loss of light emitted from the light emitting diodes.

DISCLOSURE

Technical Problem

Embodiments provide a head up display device which may display a virtual image having improved luminance and high optical uniformity to a driver in a head positioned up state.

Further, embodiments provide a head up display device in which a plurality of optical members is disposed between a light source and an image panel so as to improve optical uniformity and thus acquire a high-quality image.

Technical Solution

In one embodiment, a head up display device includes at least one light source for emitting light, a first optical member for changing the path of light emitted from the at least one light source, an optical sheet for transferring light emitted from the first optical member to a second optical member, and the second optical member for changing the path of light transferred from the optical sheet, and including a first surface in the direction of the optical sheet and a second surface in the direction of an image panel, the first surface and the second surface being curved surfaces.

The head up display device may further include a reflective member for changing the path of light emitted from the second optical member.

The first optical member may include a plurality of curved surfaces.

The number of the curved surfaces of the first optical member may be the same as the number of the at least one light source.

The cross-sections of the respective surfaces of the first optical member may have an oval shape.

At least a part of the cross-sections of the respective curved surfaces of the first optical member has a shape defined by an Equation $(x^2/A^2)+(y^2/B^2)+(z^2/C^2)=c^2$, wherein $3<A<10$, $3<B<10$, and $3<C<10$.

The optical sheet may be a diffuser sheet or a prism sheet.

The optical sheet may be vertical to a main direction of light transferred from the first optical sheet to the second optical sheet.

The first surface of the second optical member may be convex in the direction of the optical sheet, and the second surface of the second optical member may be convex in the opposite direction to the first surface.

The arrangement direction of the light sources may be the same as the arrangement direction of the first surface and the second surface of the second optical member.

The curvature of the first surface may be 15 to 30.

The shape of the second surface may be symmetrical with the shape of the first surface about the center of the second optical member.

In another embodiment, a head up display device includes an image generating unit for generating an image having information, a plurality of light sources for emitting light, an optical guide unit disposed on the optical axes of the light sources so as to guide light emitted from the light sources to the image generating unit, and a virtual image optical unit for generating a virtual image by projecting the image generated by the image generating unit, wherein the optical guide unit includes a first optical member disposed on the light sources and including a base substrate and lens parts protruding from the base substrate, and a second optical member disposed on the first optical member, and including a light incidence surface being convex in the direction of the light sources and a light exit surface being convex in the direction of the image generating unit opposite the light incidence surface.

The optical guide unit may further include an intermediate member disposed between the first optical member and the second optical member, and the intermediate member may be a diffuser plate.

The intermediate member may include at least one of a prism sheet and a DBEF.

The base substrate may be disposed so as to be vertical to the optical axes, and the light sources may be arranged on the base substrate in at least one of the x-axis direction and the y-axis direction vertical to the x-axis direction.

The base substrate may be disposed so as to face the light sources, and the lens parts may be disposed so as to face the second optical member.

The lens parts may have an oval or semielliptical shape.

The lens parts may be provided in plural, and the lens parts may be disposed so as to respectively correspond to the light sources.

The lens parts may be disposed so as to be spaced apart from one another.

The lens parts may be disposed such that the edge of each lens part overlaps the edge of at least one adjacent lens part.

The second optical member may have a vertical cross-section formed by connecting a first curved line forming the light incidence surface and a second curved line forming the light exit surface.

The vertical cross-section may include the first curved line, the second curved line, and straight lines connecting the first curved line and the second curved line.

The second optical member may be a horizontal column formed by extending the vertical cross-section in the x-axis direction.

The second optical member may include a plurality of horizontal columns disposed so as to overlap each other in the y-axis direction.

The horizontal columns of the second optical members may overlap each other in the y-axis direction so as to correspond to rows in which the light sources are arranged.

The central portions of the curved surfaces of the horizontal columns and the central portions of the lens parts may be disposed on the optical axes of the light sources.

The optical guide unit may further include a housing unit for receiving the first optical member, the intermediate member and the second optical member.

The virtual image optical unit may include at least one reflection mirror, a position adjustment unit for adjusting the position of the at least one reflection mirror, and a driving motor unit for controlling the position adjustment unit so as to adjust at least one of a reflection angle and a diffraction angle of the at least one reflection mirror.

Advantageous Effects

Embodiments provide a head up display device which improves optical uniformity of an image, compared to a conventional head up display device.

Further, embodiments provide a head up display device which includes a plurality of optical members to concentrate or diffuse light emitted from a light source and may thus adjust a beam shape of light supplied to an image panel, transfer uniform light and provide a virtual image having improved quality to a driver.

DESCRIPTION OF DRAWINGS

FIGS. 10a and 10b are views illustrating embodiments of a first optical member of the head up display device of FIG. 8.

BEST MODE

Hereinafter, embodiments will be apparently described with reference to the annexed drawings and description. However, the embodiments set forth herein may be variously modified, and it should be understood that there is no intent to limit the disclosure to the particular forms disclosed, but on the contrary, the embodiments are to cover all modifications, equivalents, and alternatives falling within the spirit and scope of the disclosure as defined by the claims. The embodiments are provided to more completely describe the disclosure to those skilled in the art.

In the following description of the embodiments, it will be understood that, when each element is referred to as being formed "on" or "under" another element, it can be directly "on" or "under" the other element or be indirectly formed with one or more intervening elements therebetween. In addition, it will also be understood that "on" or "under" the element may be described based on the drawings. Further, when an element is referred to as being formed "on" or "under" another element, not only the upward direction of the former element but also the downward direction of the former element may be included.

In addition, it will be understood that, although the relational terms "first", "second", "upper", "lower", etc. may be used herein to describe various elements, these terms neither require nor connote any physical or logical relations between substances or elements or the order thereof, and are used only to discriminate one substance or element from other substances or elements.

Figure 1:
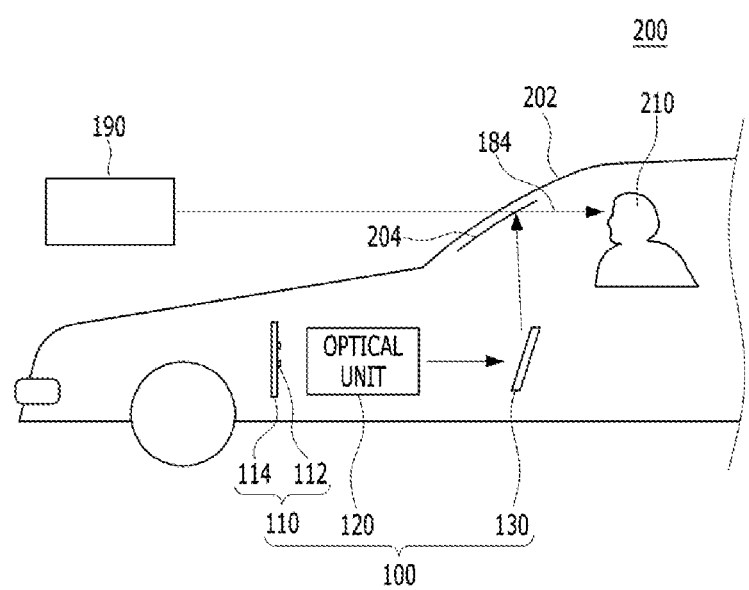
FIG. 1 is a view illustrating a vehicle in which a head up display device in accordance with a first embodiment is mounted.

FIG. 1 is a view illustrating a vehicle in which a head up display device in accordance with a first embodiment is mounted.

A head up display device 100 exemplarily shown in FIG. 1 may include a light source unit 110, an optical unit 120, an image panel 130, and a control unit.

The light source unit 110 emits light, and may include at least one light source 112 and a substrate 114.

The at least one light source 112 may be arranged on the substrate 114. An electrode pattern for conductive connection to the at least one light source 112 may be formed on the substrate 114, and the substrate 114 may be a Printed Circuit Board (PCB) formed of any one selected from the group consisting of polyethylene terephthalate (PET), glass, polycarbonate (PC) and silicon, or be formed as a film.

Further, the substrate 114 may selectively employ a single layer PCB, a multilayer PCB, a ceramic substrate, a metal core PCB, etc.

The control unit serves to drive the at least one light source 112 through the substrate 114. Here, the at least one light source 112 may include a plurality of light sources. For example, the at least one light source 112 may be a Light Emitting Diode (LED) or Light Amplification by Stimulated Emission of Radiation (laser), but the embodiments are not limited in terms of kinds of light source 112.

The at least one light source 112 may be a side view type light emitting diode or a top view type light emitting diode.

If the light source 112 is a LED chip, the LED chip may be a blue LED chip or ultraviolet LED chip, or be a package in which one or more of a red LED chip, a green LED chip, a blue LED chip, a yellow green LED chip and a white LED chip are combined.

Here, a white LED may be implemented by combining a yellow phosphor with a blue LED, combining both a red phosphor and a green phosphor with a blue LED, or combining a yellow phosphor, a red phosphor and a green phosphor with a blue LED.

If the at least one light source 112 includes a plurality of light sources, the light sources may emit light having different wavelengths or emit light having the same wavelength. Here, the control unit controls whether or not at least one of the light sources 112 emits light through the substrate 114 so that the light sources 112 may be alternately operated.

Further, if the light sources 112 emit red, green and blue light, in order to express a head-up displayed virtual image in color, the control unit 150 may control flickering of the light sources 112 through the substrate 114.

If the illustrated head up display device 100 includes a motor (not shown) to vary the positions of the light sources 112, the control unit may operate the motor so as to control the position of the at least one light source 112.

Further, in order to adjust luminance of a virtual image which will be head-up displayed, the control unit may control a degree of brightness of light emitted from the at least one light source 112. Therefore, light of high quality may be provided at night or in the daytime when strong and direct sunlight is present.

The optical unit 120 may include a first optical member, an optical sheet and a second optical member, and will be described later.

Although not shown in the drawings, an optical guide unit may be disposed between the light source unit 112 and the optical unit 120. The optical guide unit is disposed on an optical axis of the least one light source 112 and guides light emitted from one light source 112 to the optical unit 120. The optical guide unit may include, for example, any one of an acrylic resin, such as Polymethylmethacrylate (PMMA), or a polyethylene terephthalate (PET), Cyclic Olefin Copolymers (COC), polyethylene naphthalate (PEN), Polycarbonate (PC), Polystyrene (PS) or Methacrylate styrene (MS) resin, but the embodiments are not limited to materials of the optical guide unit.

The image panel 130 generates an image having information and may include, for example, a Liquid Crystal Display (LCD), a Digital Light Processing (DLP) display or a Liquid Crystal on Silicon (LCoS), but the embodiments are not limited to kinds of the image panel 130.

For example, if the image panel 130 is an LCD, a liquid crystal panel of the LCD includes two glass plates and a liquid crystal layer interposed between the glass plates and form device patterns, i.e., dots (pixels) connected by wirings, and each pixel is controlled by a thin film transistor (TFT). As such, the LCD is a well-known image display device which displays an image.

The control unit provides image data having information to the image panel 130, and the image panel 130 generates an image using the image data received from the control unit. For this purpose, the control unit may be conductively connected to an external vehicle information provision unit (not shown) and receive image data therefrom. For example, the vehicle information provision unit may include a kind of computer including software which may execute various functions for vehicles, i.e., an Electronic Control Unit (ECU).

Further, the control unit may execute a function of supplying power required by the head up display device 100 in accordance with this embodiment.

The head up display device 100 may be mounted mainly in vehicles, airplanes, etc. and, herein, the head up display device 100 may be disposed under a windshield 202, but the embodiments are not limited to positions of the head up display device 100 in a vehicle 200.

As exemplarily shown in FIG. 1, the vehicle 200 may include the head up display device 100, the windshield 202, and an optical combiner 204. Although the head up display device 100 may be disposed under the windshield 202, the embodiments are not limited to positions of the head up display device 100 in the vehicle 200.

Although not shown in the drawings, the head up display device 100 may further include a reflective member which transfers light emitted from the image panel 130 to the optical combiner 204.

A virtual image projected by the image panel 130 may be radiated onto the optical combiner 204. If the virtual image is radiated onto the optical combiner 204, the optical combiner 204 may diffract radiated light so as to allow a driver to recognize the virtual image 190 and the driver may view an image 184 transmitted from the virtual image 190. The optical combiner 204 may include a hologram (not shown) disposed on the windshield 202, and the hologram may be omitted as circumstances require.

Figure 2:
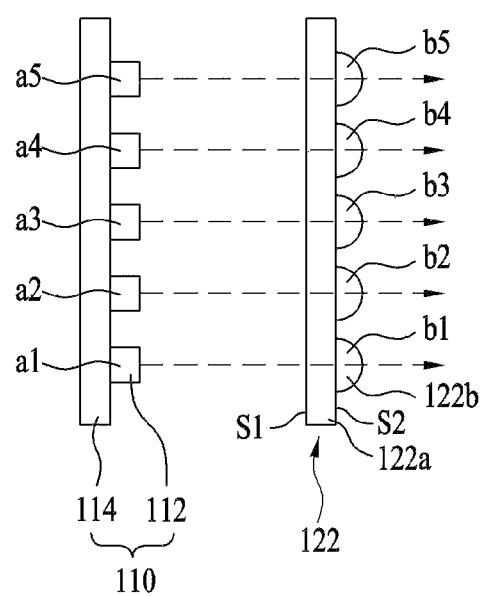
FIG. 2 is a view illustrating light sources and a first optical member in FIG. 1.

FIG. 2 is a view illustrating the light sources and the first optical member in FIG. 1.

The light source unit 110 includes five light sources 112 (a1~a5) arranged on the substrate 114, and the first optical member 122 includes a body 122a and curved surfaces 122b. Five curved surfaces b1~b5 may be formed in the same manner as the light sources a1~a5. Here, the respective curved surfaces 122b may be arranged on optical axes of light beams emitted from the respective light sources a1~a5 (shown by dotted lines).

The arrangement direction of the five light sources a1~a5 and the arrangement direction of a first surface S1 and a second surface S2 in a second optical member 124 may be the same.

The first optical member 122 may include the first surface S1 formed in the direction of the light source unit 110 and the second surface S2 formed in the opposite direction, and the curved surfaces b1~b5 may be formed on the second surface S2. Further, the arrangement direction of the five light sources a1~a5 and the arrangement direction of the first surface S1 and the second surface S2 in the second optical member 124 may be the same.

At least a part of the cross-sections of the respective surfaces b1~b5 may have an oval shape and, in more detail, at least a part of the cross-sections of the respective curved surfaces b1~b5 may have a shape defined by Equation 1 below.

$(x^2/A^2)+(y^2/B^2)+(z^2/C^2)=c^2$, here, $3<A<10, 3<B<10$, $3<C<10$, and $c$ is a constant. Equation 1

Figure 3:
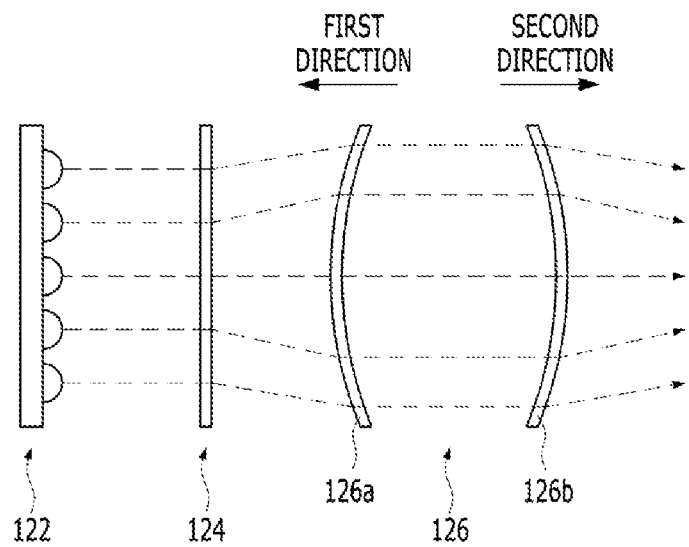
FIG. 3 is a view illustrating the first optical member, an optical sheet and a second optical member of FIG. 1.
Figure 4:
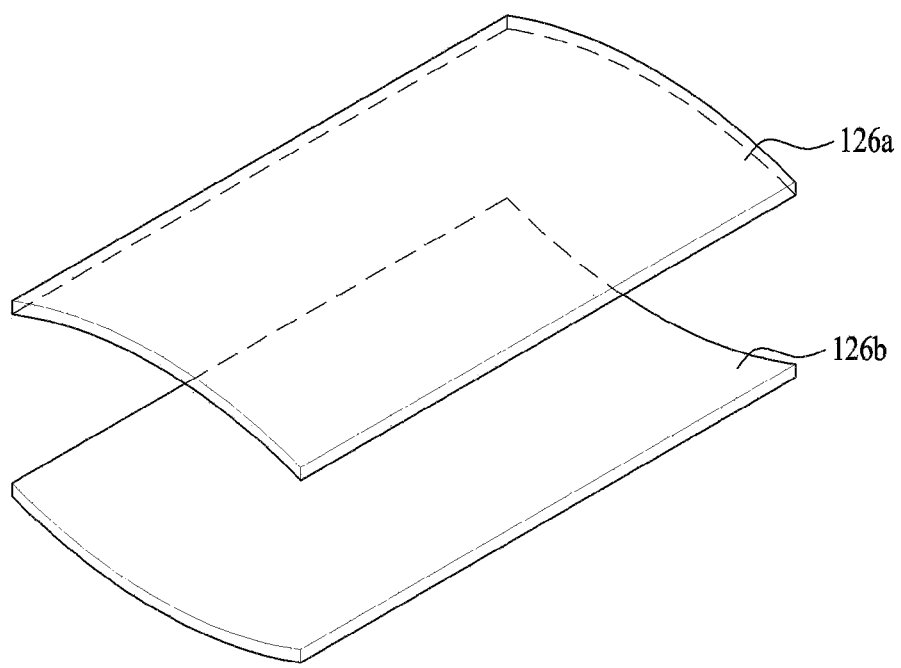
FIG. 4 is a perspective view of the second optical member of FIG. 3.

FIG. 3 is a view illustrating the first optical member, the optical sheet and the second optical member of FIG. 1, and FIG. 4 is a perspective view of the second optical member of FIG. 3.

Light, a path of which is changed by the first optical member 122, may pass through the optical sheet 124 and be transferred to the second optical member 126.

The optical sheet 124 may be a diffuser sheet or a prism sheet, and the optical sheet 124 may be vertical to a main transfer direction or an optical axis of light emitted from the first optical member 122 and supplied to the second optical member 126.

The second optical member 126 may include a first surface 126a in the direction of the optical sheet 124, i.e., in a first direction, and a second surface 126b in the direction of an image panel, which is not shown, i.e., in a second direction, and the first surface 126a and the second surface 126b may be curved surfaces.

The first surface 126a may have a convex shape in the direction of the optical sheet 124, and the second surface 126b may have convex shape in the opposite direction to the first surface.

In the second optical member 126, the curvature of the first surface S1 may be 15 to 30, the curvature of the second surface S2 may be −30 to −15, and the first surface S1 and the second surface S2 may be symmetrical about the center of the second optical member 126.

Figure 5:
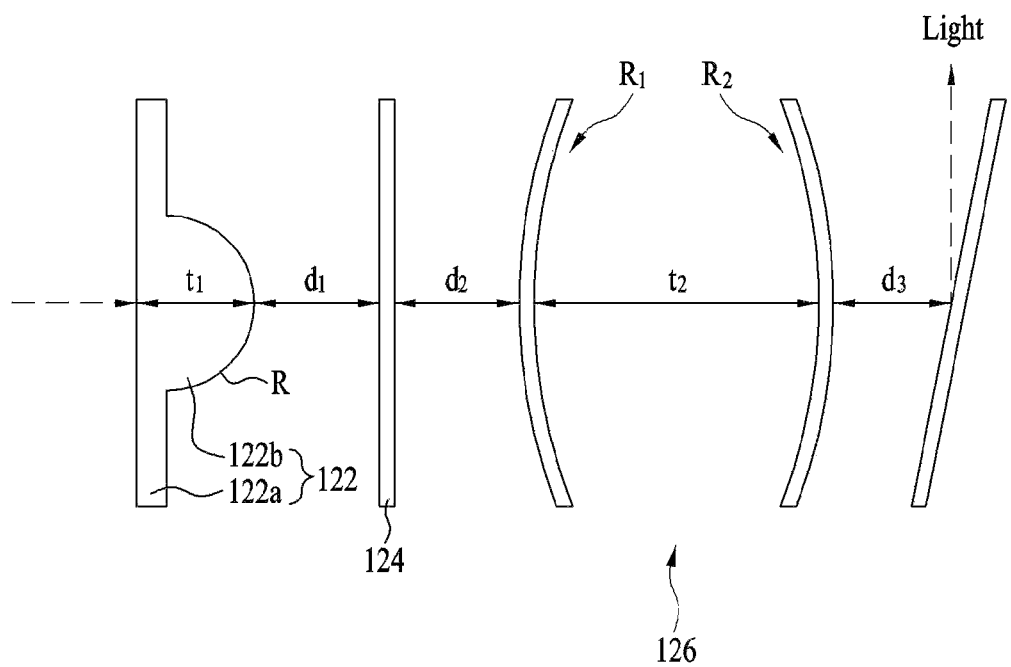
FIG. 5 is a view illustrating disposition of the head up display device in accordance with the first embodiment.

FIG. 5 is a view illustrating disposition of the head up display device in accordance with the first embodiment.

In FIG. 5, the curvature of the curved surfaces 122b in the first optical member may satisfy Equation 2 below.

$(x^2/A^2)+(y^2/B^2)+(z^2/C^2)=1$, here, $A=4.64, B=5.5$, and $3=4.59$. Equation 2

Curvatures R1 and R2 of the first surface and the second surface of the second optical member 126 may be −22.5 and +22.5, a thickness $t_1$ of the first optical member 122 may be 5.7 mm, and an internal thickness $t_2$ of the second optical member 126 may be 10.7 mm.

Further, a distance $d_1$ between the first optical member 122 and the optical sheet 124 may be 5.5 mm, a distance $d_2$ between the optical sheet 124 and the second optical member 126 may be 0.5 mm, and a distance $d_3$ between the second optical member 126 and the reflective member may be 5.5 mm.

Figure 6A:
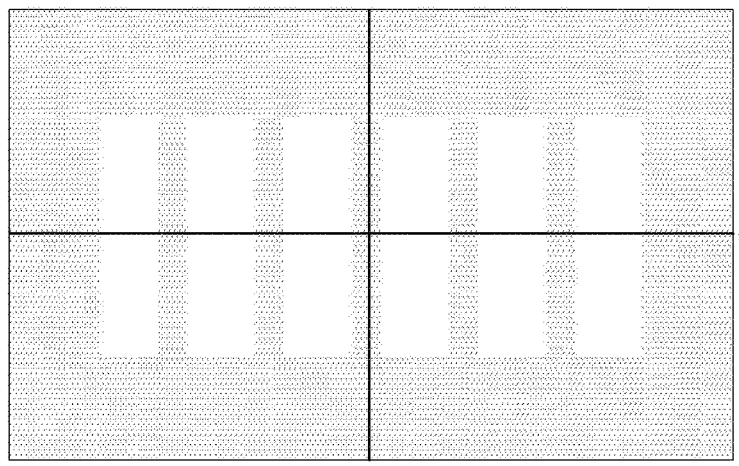
FIGS. 6a and 6b are views comparatively illustrating optical uniformity of an image formed by the head up display device in accordance with the first embodiment and optical uniformity of an image formed by a conventional head up display device.
Figure 6B:
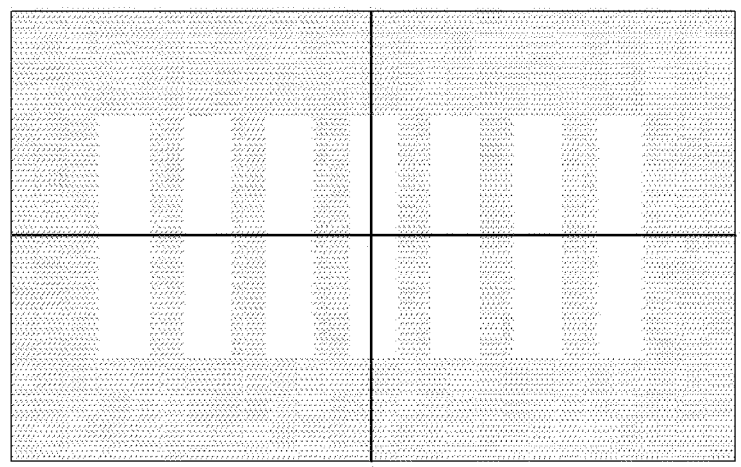

FIGS. 6a and 6b are views comparatively illustrating optical uniformity of an image formed by the head up display device in accordance with the first embodiment and optical uniformity of an image formed by a conventional head up display device.

It may be confirmed that separation spaces between the light sources are reduced and thus optical uniformity of the image formed by the head up display device in accordance with the embodiment shown in FIG. 6a is enhanced, as compared to optical uniformity of the image formed by the conventional head up display device shown in FIG. 6b.

Figure 7:
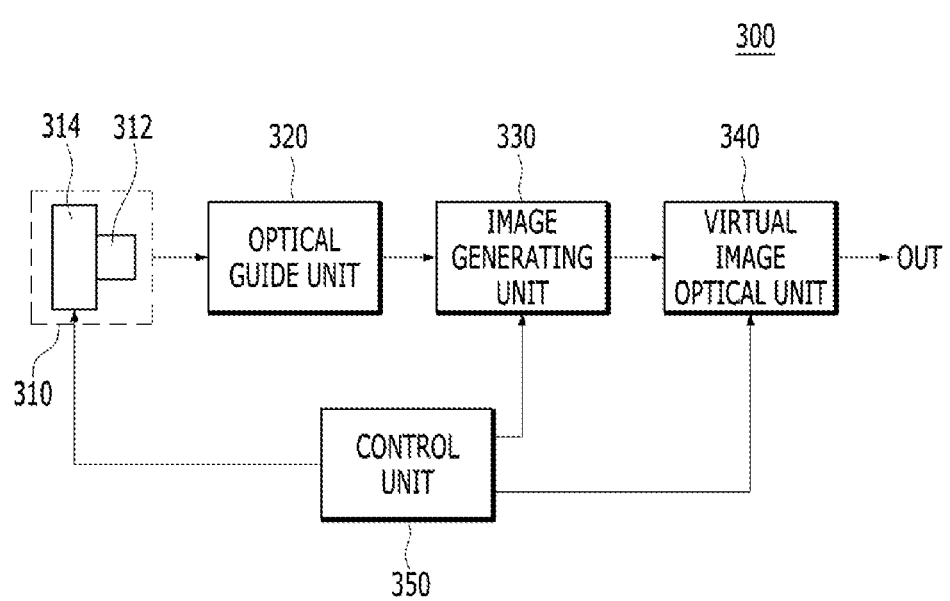
FIG. 7 is a block diagram of a head up display device in accordance with a second embodiment.

FIG. 7 is a block diagram of a head up display device in accordance with a second embodiment.

The head up display device in accordance with the second embodiment may include a light source unit 310, an optical guide unit 320, an image generating unit 330, a virtual image optical unit 340 and a control unit 350.

The light source unit 310 emits light supplied to the image generating unit, and may include a plurality of light sources 312 and a substrate 314.

The light sources 312 may be arranged on the substrate 314. An electrode pattern for conductive connection to the light sources 312 may be formed on the substrate 314, and the substrate 314 may be the same as the substrate 114 described above with reference to FIG. 1.

The control unit 350 may serve to drive the light sources 312 through the substrate 314.

Each of the light sources 312 may be, for example, a Light Emitting Diode (LED) or Light Amplification by Stimulated Emission of Radiation (laser), but the embodiments are not limited in terms of kinds of light sources 312.

Each of the light sources 312 may be a side view type light emitting diode or a top view type light emitting diode.

Further, each of the light sources 312 of the light source unit 310 may be a Light Emitting Diode (LED) chip, a light emitting diode package in which a LED is fixed to a body, or a light emitting module further including an optical member in addition to a light emitting diode package.

In order to adjust luminance of a virtual image, which will be displayed by the head up display device, the control unit 350 may control a degree of brightness of light emitted from the light sources 312. Therefore, light of high quality may be provided according to surrounding environments, i.e., at night or in the daytime when strong and direct sunlight is present.

The optical guide unit 320 is arranged on optical axes of the light sources 312 and may thus guide light emitted from the light source unit 310 to the image generating unit 330.

The image generating unit 330 may generate an image having information and project the image having information as 'image light' by light guided by the optical guide unit 320.

For example, the image generating unit 330 may include, for example, a Liquid Crystal Display (LCD), a Digital Light Processing (DLP) display or a Liquid Crystal on Silicon (LCoS), but the embodiments are not limited to kinds of the image generating unit 330.

The control unit 350 provides image data having information to the image generating unit 330, and the image generating unit 330 generates an image using the image data received from the control unit 350. For this purpose, the control unit 150 may be conductively connected to an external vehicle information provision unit (not shown) and receive image data therefrom. For example, the vehicle information provision unit may be an Electronic Control Unit (ECU), and the control unit 350 and the ECU may be conductively connected.

The ECU may store and control information regarding driving of a vehicle and devices of the vehicle, and the control unit 350 may serve to receive such information data and then to convert such data into image data so as to implement image information.

For example, the control unit 350 may execute a process of converting driving information transmitted from an internal system of the vehicle, i.e., the ECU, into data which may be displayed.

In addition, the control unit 350 may serve to supply power required for the head up display device 300 in accordance with the second embodiment. For example, the control unit 350 may supply power to the substrate 314 and the image generating unit 330, respectively.

The virtual image optical unit 340 may generate a virtual image from image light projected by the image generating unit 330 to acquire an image, and output the virtual image through an output terminal OUT.

The virtual image optical unit 340 may include at least one reflection mirror and may further include a position adjustment unit to adjust the position of the at least one reflection mirror and a driving motor unit to control the position adjustment unit so as to adjust at least one of a reflection angle and a diffraction angle of the at least one reflection mirror.

For example, the at least one reflection mirror may include any one of a flat mirror, a concave mirror, a convex mirror and a customized free-form mirror.

The reflection mirror may include a reflective layer formed of at least one of aluminum (Al), silver (Ag) and gold (Au) and provided on the surface of the reflection mirror.

Further, the at least one reflection mirror may include a direction changeable mirror which changes a projection direction of supplied image light.

Hereinafter, in order to assist understanding of the head up display device 300 exemplarily shown in FIG. 7, the head up display device 300 mounted in a vehicle 400 will be described. However, the head up display device 300 exemplarily shown in FIG. 8 may be mounted in various means of transportation, such as an airplane, etc., in addition to the vehicle 400 exemplarily shown in FIG. 8.

Figure 8:
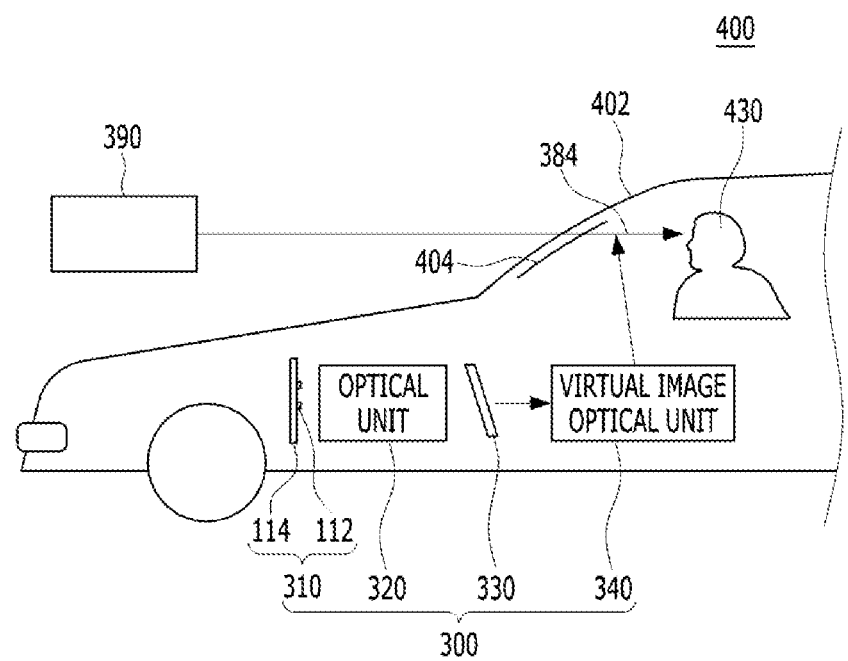
FIG. 8 is a view illustrating one embodiment of a vehicle in which the head up display device exemplarily shown in FIG. 7 is mounted.

FIG. 8 is a view illustrating one embodiment of the vehicle 400 in which the head up display device exemplarily shown in FIG. 7 is mounted and, here, the control unit 350 of FIG. 1 is omitted.

With reference to FIG. 8, the vehicle 400 may include the head up display device 300, a windshield 402 and an optical combiner 404. Although the head up display device 300 may be disposed under the windshield 402, the embodiments are not limited to positions of the head up display device 300 in the vehicle 400.

Hereinafter, x, y and z illustrated in the drawings indicate axes of the Cartesian coordinate system, but other coordinate systems may be described in the embodiments.

Figure 9:
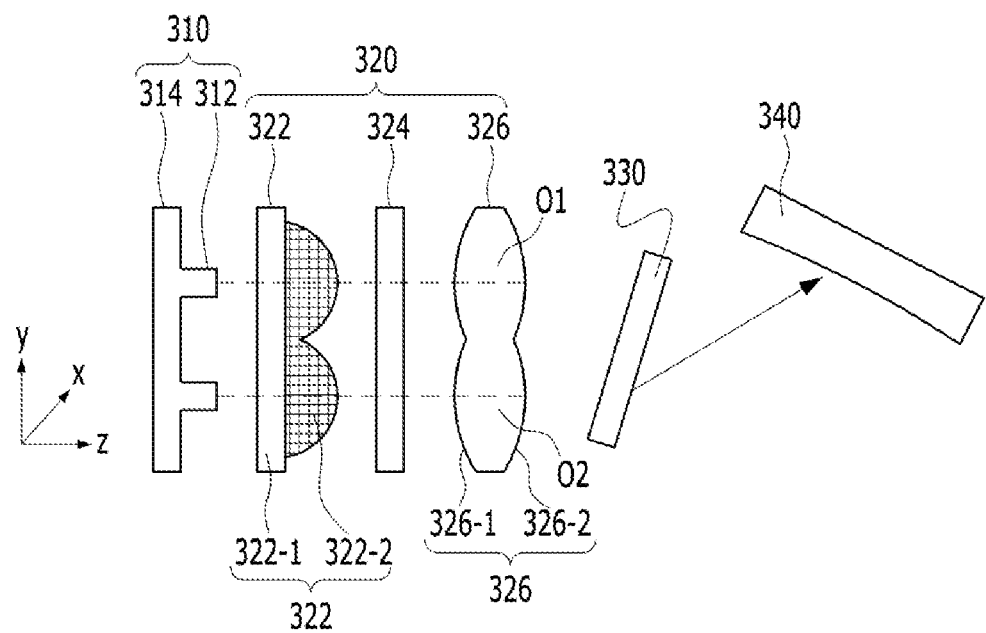
FIG. 9 is an enlarged cross-sectional view of a part of the head up display device exemplarily shown in FIG. 8.

FIG. 9 is a cross-sectional view illustrating the light source unit 310, the optical guide unit 320, the image generating unit 330 and the virtual image optical unit 340 of the head up display device 300 exemplarily shown in FIG. 8.

With reference to FIG. 9, the optical guide unit 320 may be disposed between the light source unit 310 and the image generating unit 330.

The optical guide unit 320 may include a first optical member 322 disposed close to the light source unit 310, and a second optical member 326 disposed close to the image generating unit 330.

The first optical member 322 may include a base substrate 322-1 and lens parts 322-2. The lens parts 322-2 may protrude from the base substrate 322-1.

Here, the base substrate 322-1 may be disposed opposite the light sources, the lens parts 322-2 may be disposed so as to protrude in the direction of the second optical member 326, and the base substrate 322-1 may be vertical to optical axes O1 and O2 of the light source unit 310.

The second optical member 326 may be disposed on the first optical member 322, and include light incidence surfaces 326-1 having a convex shape in the direction of the light source unit 310 including the light sources, and light exit surfaces 326-2 having a convex shape in the direction of the image generating unit 330 in opposition to the light incidence surfaces.

Further, the optical guide unit 320 may further include an intermediate member 324.

The intermediate member 324 may be disposed between the first optical member 322 and the second optical member 326. The intermediate member 324 may diffuse light from the light sources, which is concentrated via the first optical member 322.

For example, the intermediate member 324 may be a diffuser sheet.

The intermediate member 324 may diffuse light from the light sources, having passed through the first optical member, and thus optical uniformity of light passing through the intermediate member may be improved.

For example, the intermediate member 324 included in the optical guide unit may reduce light spots caused by a brightness difference between the center and the edge of the light source and, thus, uniform light may be acquired.

Further, the intermediate member 324 may include at least one of a prism sheet and a Dual Brightness Enhancement Film (DBEF). If the intermediate member 324 includes the prism sheet or the DBEF, brightness of light having passed through the intermediate member 324 may be increased.

The central portions of the lens parts 322-2 of the first optical member may be located on the optical axes O1 and O2 of the light sources 312 so that the optical axes of the light sources 312 and the optical axes of the lens unit 322-2 coincide with each other, and the central portions of the light incidence surfaces 326-1 of the second optical member and the central portions of the light exit surfaces 326-2 may be disposed so as to be located on the optical axes O1 and O2 of the light sources 312.

In the head up display device in accordance with the embodiment shown in FIG. 9, the light sources 312 may be arranged in two rows. For example, although the head up display device in accordance with the embodiment shown in FIG. 9 may include six light sources, the embodiments are not limited to the number of the light sources 312. That is, the light source unit 310 of the head up display device 300 in accordance with the second embodiment may include a number of light sources 312 which is greater or less than six.

For example, in the embodiment shown in FIG. 6a, among six light sources, three light sources are arranged in the x-axis direction such that two rows, each of which has three light sources, are arranged in the y-axis direction. That is, although this embodiment describes six light sources as being arranged in two rows and three columns, arrangement of the light sources is not limited thereto and may be variously modified.

Figure 10B:
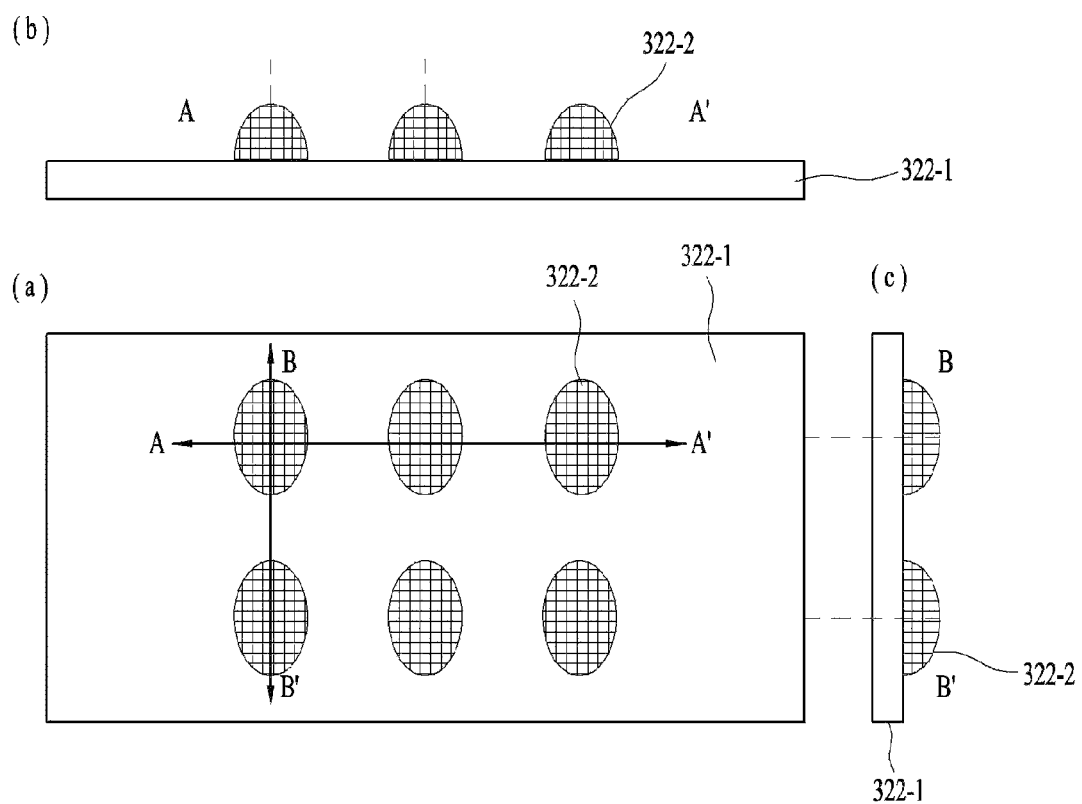

FIGS. 10a and 10b are views illustrating embodiments of the first optical member 322.

With reference to FIGS. 10a and 10b, the lens parts 322-2 of the first optical member may have a semispherical or semielliptical shape. That is, the semispherical or semielliptical lens parts 322-2 may protrude from the base substrate 322-1.

Here, the lens part 322-2 may have a size to cover the light source, and the cross-sectional area of the lens part 322-2 on a contact surface of the lens part 322-2 with the base substrate 322-1 may be greater than or equal to the cross-sectional area of the light source.

In FIG. 10a, (a) is a plan view of the first optical member, (b) is a cross-sectional view taken along line A-A' of (a), and (c) is a cross-sectional view taken along line B-B' of (a).

The lens parts 322-2 disposed so as to correspond to the respective light sources may be formed such that the edge of each lens part overlaps the edge of at least one adjacent lens part.

For example, with reference to FIG. 10a, the lens parts adjacent to each other in the row direction are spaced from each other but the lens parts adjacent to each other in the column direction are disposed so that the edges thereof overlap each other.

Otherwise, although not shown in the drawings, the lens parts 322-2 may be disposed such that the lens parts adjacent to each other in the column direction are spaced from each other but the edges of the lens parts adjacent to each other in the row direction overlap each other.

Otherwise, the lens parts may be disposed such that the edges of all lens parts adjacent to each other overlap each other.

Here, the arrangement interval of the lens parts 322-2 may be varied according to the arrangement interval of the corresponding light sources.

In FIG. 10b, the horizontal cross-section of the lens parts 322-2 may have an oval shape and, for example, the lens parts 322-2 having a semielliptical shape may be formed on the base substrate 322-1.

In FIG. 10b, (a) is a plan view of the first optical member, (b) is a cross-sectional view taken along line A-A' of (a), and (c) is a cross-sectional view taken along line B-B' of (a).

A plurality of lens parts 322-2 may be disposed so as to be spaced apart from each other. For example, with reference to FIG. 10b, not only the lens parts adjacent to each other in the row direction but also the lens parts adjacent to each other in the column direction may be spaced apart from each other.

Although FIG. 10b illustrates lens parts having an oval horizontal cross-section having a major axis in the vertical direction, the shape of the lens parts 322-2 is not limited thereto and may have an oval horizontal cross-section having a major axis in the horizontal direction or a circular horizontal cross-section.

In the first optical member in accordance with the embodiment shown in FIG. 10a or 10b, light emitted from the light sources passes through the lens parts 322-2 and may be concentrated in the direction of the image generating unit, due to the lens parts 322-2 protruding in the direction of the image generating unit.

Therefore, if the arrangement of the light sources is changed, the arrangement of the lens parts of the first optical member may be changed correspondingly.

Figure 11:
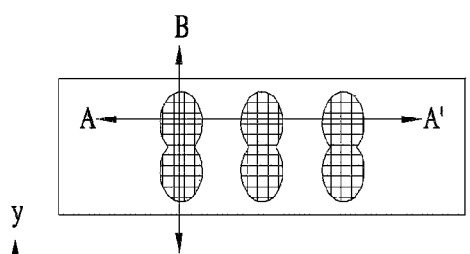
FIG. 11 illustrates plan, perspective and cross-sectional views of one embodiment of the first optical member of the head up display device of FIG. 8.
Figure 11:
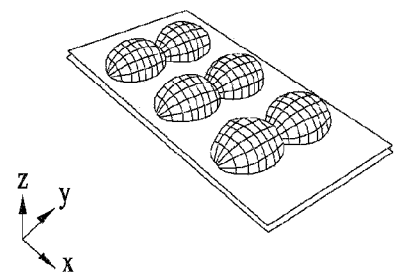
Figure 11:
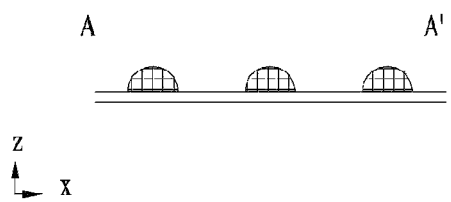
Figure 11:
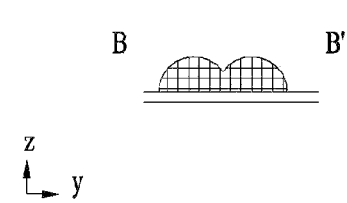

FIG. 11 illustrates one embodiment of the first optical member.

In FIG. 11, (a) is a plan view of the first optical member and, in the embodiment shown in FIG. 11, the lens parts 122-2 may have an oval shape in which a diameter thereof in the y-axis direction is greater than a diameter thereof in the x-axis direction, and the lens parts adjacent to each other in the y-axis direction, i.e., in the column direction, may be formed such that regions thereof adjacent to each other overlap each other.

In FIG. 11, (b) is a perspective view of the first optical member, (c) is a cross-sectional view taken along line A-A' of (a), and (d) is a cross-sectional view taken along line B-B' of (a).

For example, the first optical member shown in FIG. 11 may be an optical member used if the head up display device has six light sources arranged in two rows and three columns.

The first optical members in accordance with the embodiments shown in FIGS. 10a to 11 may be configured such that the lens parts are arranged so as to correspond to the light sources and thus light emitted from the light sources passes through the first optical member so as to be concentrated and then emitted.

That is, the first optical member is disposed on the light source unit so that light emitted from the light sources and then diffused is concentrated, thereby increasing brightness of light traveling in the direction of the image generating unit and thus improving luminous efficacy of the light source unit.

Figure 12:
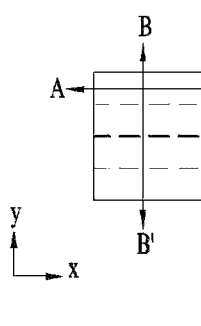
FIG. 12 illustrates plan, perspective and cross-sectional views of one embodiment of a second optical member of the head up display device of FIG. 8.
Figure 12:
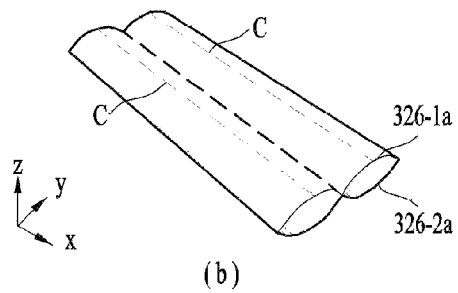
Figure 12:
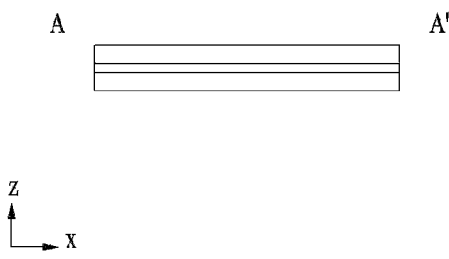
Figure 12:
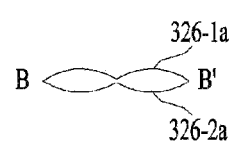

FIG. 12 illustrates one embodiment of the second optical member.

In FIG. 12, (a) is a plan view of the second optical member, and a portion shown by a dotted line is the central portion C of the second optical member and may be disposed on the optical axis of the light source. That is, the central portion C of the second optical member may be the most protruding portion of the curved surface of a horizontal column.

In FIG. 12, (b) is a perspective view of the second optical member, (c) is a cross-sectional view taken along line A-A' of (a), and (d) is a cross-sectional view taken along line B-B' of (a).

That is, the second optical member may have a vertical cross-section formed by connecting a first curved line 326-1a forming the light incidence surface and a second curved line 326-2a forming the light exit surface, and such a cross-section may extend in the x-axis direction and thus form a horizontal column structure. Here, the vertical cross-section of the second optical member may be a cross-section on an yz plane.

The second optical member may have a 3-dimensional structure including only a part of a cylinder. That is, the second optical member may have a 3-dimensional structure in which two cylinders, cut in the height direction so as to include parts of the circumference of a circular bottom surface thereof, are connected so as to be symmetrical in the xy plane. Further, the second optical member may be configured such that such 3-dimensional structures overlap each other in the y-axis direction.

For example, in order to correspond to the light sources arranged in two rows, the second optical member may be configured such that 3-dimensional structures are disposed to overlap each other the y-axis direction.

Here, in the 3-dimensional structure of the second optical member, the central portions of the curved surfaces may be arranged on the optical axes of the light sources. FIG. 6b is a perspective view of the second optical member including two 3-dimensional structures.

Figure 13:
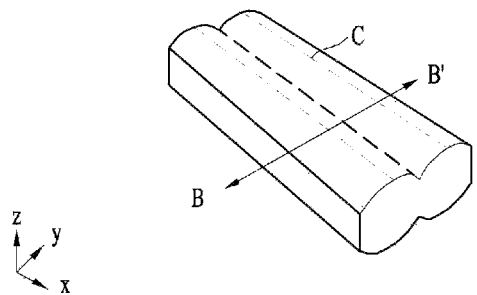
FIG. 13 illustrates another embodiment of the second optical member of the head up display device of FIG. 8.
Figure 13:
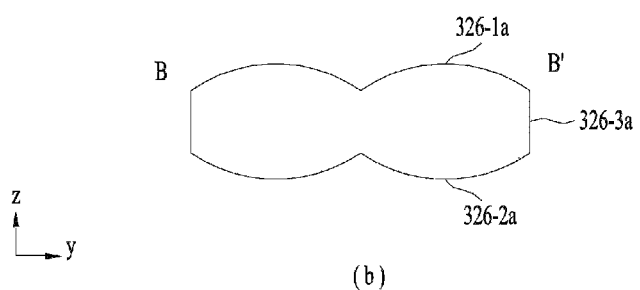

FIG. 13 illustrates another embodiment of the second optical member of the head up display device of FIG. 8. FIG. 13(a) is a perspective view of the second optical member, and FIG. 13(b) is a cross-sectional view taken along line A-A' of FIG. 13(a).

With reference to FIG. 13(b), the second optical member may have a vertical cross-section formed by connecting a first curved line 326-1a forming the light incidence surface, a second curved line 326-2a forming the light exit surface, and straight lines 326-3a connecting the first curved line 326-1a and the second curved line 326-2a.

Further, with reference to FIG. 13(a), the second optical member may have a 3-dimensional structure, i.e., a horizontal column structure formed by extending the vertical cross-section shown in FIG. 13(b) in the x-axis direction.

That is, the second optical member in accordance with the embodiment shown in FIG. 13 may include the light incidence surface and the light exit surface respectively extending in the x-axis direction and have a 3-dimensional structure formed by the two curved surfaces, i.e., the light incidence surface and the light exit surface, and side surfaces formed by connecting both ends of the light incidence surface and the light exit surfaces.

With reference to the embodiments shown in FIGS. 12 and 13, the light incidence surface of the second optical member may be a convex shape in the direction of the first optical member, the light exit surface of the second optical member may be a convex shape in the direction of the image generating unit and, among light emitted from the light sources, light in the vertical direction, i.e., in the y-axis direction, may be more concentrated due to such a curved shape of the second optical member.

The first optical member 322 and the second optical member 325 in accordance with any one of the embodiments shown in FIGS. 10a to 13 may be formed of the same material as the optical guide unit of the head up display device in accordance with the above-described first embodiment.

Of course, the base substrate 322-1 and the lens parts 322-2 of the first optical member 322 may be formed of the same material and, for example, the base substrate and the lens part may be formed integrally.

Figure 14:
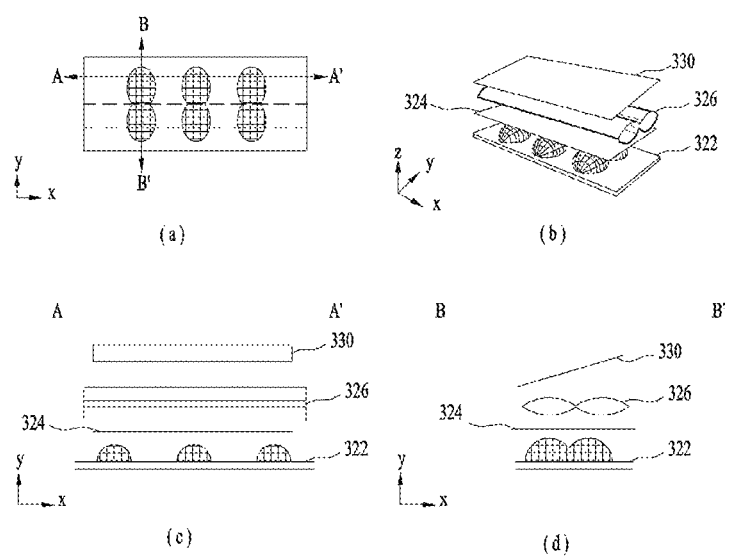
FIG. 14 illustrates disposition of an optical guide unit and an image generating unit of the head up display device of FIG. 8.

FIG. 14 illustrates one embodiment of the optical guide unit 320 including the optical members.

FIG. 14(a) is a plan view illustrating disposition of the optical guide unit 320 and the image generating unit 330, FIG. 14(b) is a perspective view, FIG. 14(c) is a cross-sectional view taken along line A-A' of FIG. 14(a), and FIG. 14(d) is a cross-sectional view taken along line B-B' of FIG. 14(a).

With reference to FIG. 14, the optical guide unit 320 may include the first optical member 322 disposed close to the light source unit, the intermediate member 324 disposed on the first optical member, and the second optical member 326 disposed on the intermediate member.

Although not shown in the drawings, the optical guide unit 320 may further include a housing unit to receive the first optical member 322, the intermediate member 324 and the second optical member 326. For example, in the housing unit, the first optical member, the intermediate member and the second optical member may be stacked, and holder units to fix the respective optical members so that the first optical member, the intermediate member and the second optical member may be disposed by designated intervals may be further provided in the housing unit.

Here, in the optical guide unit 320, the first optical member 322 may concentrate light supplied from the light sources in the direction of the image generating unit 330, the intermediate member 324 may uniformly distribute the concentrated light, and the second optical member 326 may concentrate more light in the vertical direction, i.e., y-axis direction, out of the light, thereby improving luminous efficacy of light supplied from the light source unit to the image generating unit.

Figure 15A:
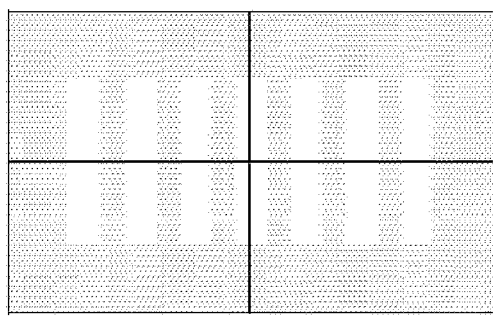
FIG. 15a is a view illustrating a result of simulation of optical characteristics of a conventional head up display device including no optical guide unit.
Figure 15B:
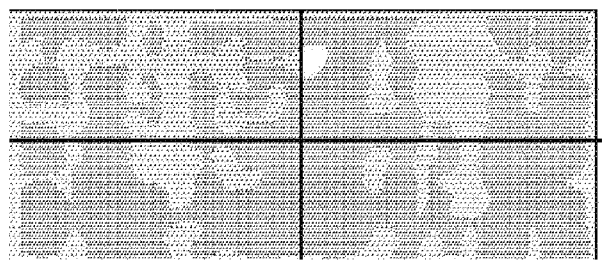
FIG. 15b is a view illustrating a result of simulation of optical characteristics of the head up display device in accordance with the second embodiment.

FIGS. 15a and 15b are views illustrating results of simulation of output images, formed by supplying light from the light source unit to the image generating unit.

FIG. 15a is a view illustrating a result of output of an image in a conventional head up display device including no optical guide unit, and FIG. 15b is a view illustrating a result of output of an image of the image generating unit in the head up display device including the optical guide unit in accordance with the second embodiment.

In the conventional head up display device including no optical guide unit in accordance with the embodiment, as exemplarily shown in FIG. 15a, light spots are generated due to deviation of light emitted from areas provided with the light sources and separation spaces between the light sources according to arrangement of the light sources, and it may be confirmed that overall luminance of an output image is low.

Conversely, in the head up display device including the optical guide unit in accordance with the second embodiment, as exemplarily shown in FIG. 15b, light spots are reduced due to reduced deviation of brightness between areas provided with the light sources and separation spaces between the light sources, and thus it may be confirmed that overall luminance of an output image is enhanced.

That is, the head up display device in accordance with the second embodiment includes a plurality of optical members in the optical guide unit and may thus improve luminance of a virtual image generated by concentrating light emitted from the light sources. Further, the intermediate member of the optical guide unit uniformly diffuses the concentrated light and may thus enhance optical characteristics of the virtual image generated using light supplied through the optical guide unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

A head up display device in accordance with one embodiment may be mounted in various means of transportation, such as a vehicle, an airplane, etc.

The invention claimed is:
1. A head up display device comprising:
at least one light source for emitting light;
a first optical member configured to change a path of the light emitted from the at least one light source and transmit the light;
a second optical member;
an optical sheet for transferring the light transmitted from the first optical member to the second optical member;
wherein the second optical member is configured to change a path of the light transferred from the optical sheet and transmit the light, and includes a first surface in a direction of the optical sheet and a second surface in a direction of an image panel, the first surface and the second surface being curved surfaces and being symmetrically disposed with respect to an imaginary line perpendicular to an optical axis of the second optical member; and
an optical guide unit disposed on optical axes of the at least one light source so as to guide the light emitted from the at least one light source.

2. The head up display device according to claim 1, comprising a reflective member for changing a path of the light transmitted from the second optical member.

3. The head up display device according to claim 1, wherein the first optical member includes a plurality of curved surfaces, and each of the plurality of curved surfaces is disposed on the optical axes of the light emitted from the at least one light source.

4. The head up display device according to claim 3, wherein a number of the curved surfaces of the first optical member is the same as a number of the at least one light source.

5. The head up display device according to claim 3, wherein a cross-section of each surface of the first optical member has an oval shape.

6. The head up display device according to claim 3, wherein at least a part of a cross-section of each curved surface of the first optical member has a shape defined by Equation below, $$(x^2/A^2) \pm (y^2/B^2) + (z^2/C^2) = c^2,$$

wherein 3<A<10, 3<B<10, and 3<C<10.

7. The head up display device according to claim 1, wherein the optical sheet is vertical to a main direction of the light transferred from the first optical member to the second optical member and wherein the optical sheet includes a first surface and a second surface, the first surface and the second surface being flat and perpendicular to the optical axis.

8. The head up display device according to claim 1, wherein the second optical member comprises a light incidence member and a light exit member being separated from each other, and wherein the light incidence member has a meniscus shape convex in the direction of the optical sheet and the light exit member has a meniscus shape convex in a direction opposite to the light incidence member.

9. The head up display device according to claim 8, wherein an arrangement direction of the at least one light source is the same as an arrangement direction of the first surface and the second surface of the second optical member.

10. A head up display device comprising:
an image generating unit for generating an image having information;
a plurality of light sources for emitting light;
an optical guide unit disposed on optical axes of the light sources so as to guide the light emitted from the light sources to the image generating unit; and
a virtual image optical unit for generating a virtual image by projecting the image generated by the image generating unit,
wherein the optical guide unit includes:
a first optical member disposed on the light sources, and including a base substrate and lens parts protruding from the base substrate; and
a second optical member disposed on the first optical member, and including a light incidence surface being convex in a direction of the light sources and a light exit surface being convex in a direction of the image generating unit opposite the light incidence surface, the light incidence surface and the light exit surface being symmetrically disposed with respect to an imaginary line perpendicular to an optical axis of the second optical member,
wherein each of the plurality of light sources has a different wavelength.

11. The head up display device according to claim 10, the optical guide unit comprising an intermediate member disposed between the first optical member and the second optical member,
wherein the intermediate member is a diffuser plate, including a first surface and a second surface, the first surface and the second surface being flat and perpendicular to the optical axis.

12. The head up display device according to claim 11, wherein the intermediate member includes at least one of a prism sheet and a Dual Brightness Enhancement Film (DBEF).

13. The head up display device according to claim 10, wherein:
the base substrate is disposed so as to be vertical to the optical axes; and
the light sources are arranged on the base substrate in at least one of an x-axis direction and a y-axis direction vertical to the x-axis direction.

14. The head up display device according to claim 10, wherein the base substrate is disposed so as to face the light sources, and the lens parts are disposed so as to face the second optical member.

15. The head up display device according to claim 10, wherein the lens parts are disposed so as to respectively correspond to the light sources.

16. The head up display device according to claim 15, wherein the lens parts are disposed so as to be spaced apart from each other.

17. The head up display device according to claim 15, wherein the lens parts are disposed such that an edge of each lens part overlaps an edge of at least one adjacent lens part.

18. The head up display device according to claim 10, wherein the second optical member has a vertical cross-section formed by connecting a first curved line forming the light incidence surface and a second curved line forming the light exit surface.

19. The head up display device according to claim 18, wherein the vertical cross-section includes the first curved line, the second curved line, and straight lines connecting the first curved line and the second curved line, and wherein each of the first curved line and the second curved line of the second optical member includes two convex shapes.

20. A head up display device comprising:
an image generating unit for generating an image having information;
a plurality of light sources for emitting light;
an optical guide unit disposed on optical axes of the light sources so as to guide the light emitted from the light sources to the image generating unit, including an optical member having a light incidence surface and a light exit surface that are symmetrically disposed with respect to an imaginary line perpendicular to an optical axis of the optical member; and
a virtual image optical unit for generating a virtual image by projecting the image generated by the image generating unit,
wherein the virtual image optical unit includes:
at least one reflection mirror;
a position adjustment unit for adjusting a position of the at least one reflection mirror; and
a driving motor unit for controlling the position adjustment unit so as to adjust at least one of a reflection angle and a diffraction angle of the at least one reflection mirror, wherein the reflection mirror includes a reflective layer formed of at least one of aluminum (Al), silver (Ag), and gold (Au) provided on a surface of the reflection mirror.

* * * * *